United States Patent [19]

Reasor et al.

[11] Patent Number: 4,537,438

[45] Date of Patent: Aug. 27, 1985

[54] LIMOUSINE HEARSE

[76] Inventors: Warren Reasor, 15708 Heyden, Detroit, Mich. 48223; Mary L. Singleton, 10325 E. Outer Dr., Detroit, Mich. 48224

[21] Appl. No.: 709,485

[22] Filed: Mar. 8, 1985

[51] Int. Cl.[3] .............................................. B60P 3/26

[52] U.S. Cl. ...................................... 296/17; 296/178; 296/24 R; 296/37.1

[58] Field of Search ...................... 296/16, 17, 18, 178, 296/64, 24 R

[56] References Cited

U.S. PATENT DOCUMENTS

| | | | |
|---|---|---|---|
| 928,179 | 7/1909 | Butler et al. | 296/17 |
| 951,193 | 3/1910 | Mather | 296/17 |
| 1,072,864 | 9/1913 | Marvin | 296/17 |
| 1,149,161 | 8/1915 | Lawson, Jr. | 296/17 |
| 1,971,991 | 8/1934 | Robertson | 414/522 |
| 3,019,047 | 1/1962 | Ahrens | 296/178 |

FOREIGN PATENT DOCUMENTS

| | | | |
|---|---|---|---|
| 47328 | 4/1981 | Japan | 296/17 |

*Primary Examiner*—Robert R. Song
*Attorney, Agent, or Firm*—Cullen, Sloman, Cantor, Grauer, Scott & Rutherford

[57] ABSTRACT

In a limousine hearse having a body, front and rear ends, a roof and a pair of longitudinally spaced doors, the improvement which comprises a unit floor extending substantially the length of the body to its rear end. A first partition upon the floor extends transversely thereof intermediate its ends defining a forward passenger compartment upon one side and an axially extending storage compartment upon its other side. An upright second partition upon the floor within the storage compartment intermediate the sides of the body defines upon one side an axially elongated storage chamber for a casket and upon its other side a second axially elongated storage chamber adapted to receive flowers. An upright closure lid is hinged upon the rear end of the body normally closing off the storage chambers.

5 Claims, 4 Drawing Figures

LIMOUSINE HEARSE

The present invention is directed to a limousine hearse having a unit floor which is partitioned to define a passenger compartment upon the forward portion of the floor and a storage compartment upon the floor extending to the rear of the body together with a second right angularly related partition within the storage compartment defining upon one side an axially elongated storage chamber adapted to receive a casket, and upon its other side an axial elongated chamber adapted to receive and enclose flowers or a second casket.

BACKGROUND OF THE INVENTION

Heretofore as is generally common place, hearse constructions provided a drivers compartment and rearwardly thereof an elongated storage compartment to receive and enclose a casket and flowers. No provision is normally made for passengers, with the result that such hearse in funeral processions are followed by a plurality of vehicles for relatives and friends.

THE PRIOR ART

It appears that more than fifty one years ago some efforts had been made to provide a self-contained hearse vehicle for carrying a plurality of passengers as well as the casket and flowers. Illustrative of such earlier prior art constructions are one or more of the following United States Patents:

| U.S. PAT. NO. | PATENT DATE | PATENT NAME |
|---|---|---|
| 928,179 | 7/13/09 | J. W. Butler et al |
| 951,193 | 3/8/10 | S. W. Mather |
| 1,072,864 | 9/9/13 | I. S. Marvin |
| 1,149,161 | 8/3/15 | B. Lawson, Jr. |
| 1,971,991 | 8/21/33 | E. J. Robertson |

The difficulty with the earlier prior art efforts to provide a composite vehicle for passengers, casket and flowers has been that the constructions were either outmoded and obsolete in accordance with current standards of transportation, and included horse drawn vehicles, electric vehicles or cumbersome constructions to provide storage compartments and passenger seating.

SUMMARY OF THE INVENTION

It is an important feature of the present invention to provide an improve limousine hearse construction and wherein in addition to the use an elongated body, having front and rear ends, a roof and a pair of longitudinally spaced doors, there is provided a unit floor which extends substantially the length of the body to the rear end thereof. Upon the floor there is provided a first transverse partition intermediate its ends which defines an elongated passenger compartment forwardly of the partition adapted to receive a plurality of seats upon opposite sides thereof and rearwardly thereof a storage compartment which extends to the rear of the vehicle body. An upright second partition upon the floor extends longitudinally thereof at right angles to the first partition and defines with the floor upon one side an axially elongated storage chamber adapted to receive a casket and upon its other side an axially elongated storage chamber adapted to receive flowers. A lid is pivotally connected to the rear end of the body normally providing an enclosure for the storage chambers.

A further feature is to provide a hearse limousine wherein within the body thereof and substantially along its length there is provided a unit floor with a first transverse partition rearwardly thereof so as to define upon one side a passenger compartment, and upon its other side extending to the rear of the body a storage compartment. A second right angular related partition upon the floor intermediate the sides of the body defines with said floor and body upon one side an axially elongated storage chamber for a casket and upon its other side an elongated storage chamber for flowers or another casket.

Another feature includes a pair of doors arranged upon one side of the body at opposite ends of the passenger compartment, steps upon one side the passenger compartment in registry with each door and a foldable ramp pivotally connected to the floor adjacent one of the doors, when unfolded adapted for engagement with the ground surface.

A further feature includes within the body of a vehicle beneath the floor thereof a pair of transverse upright partitions and therebelow a horizontal platform to define with the floor an auxiliary storage compartment over which there is pivotally connected a tilt down cover panel.

These and other features and objects will be seen from the following Specification and claims in conjunction with the appended drawings.

THE DRAWINGS

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Figure 1:
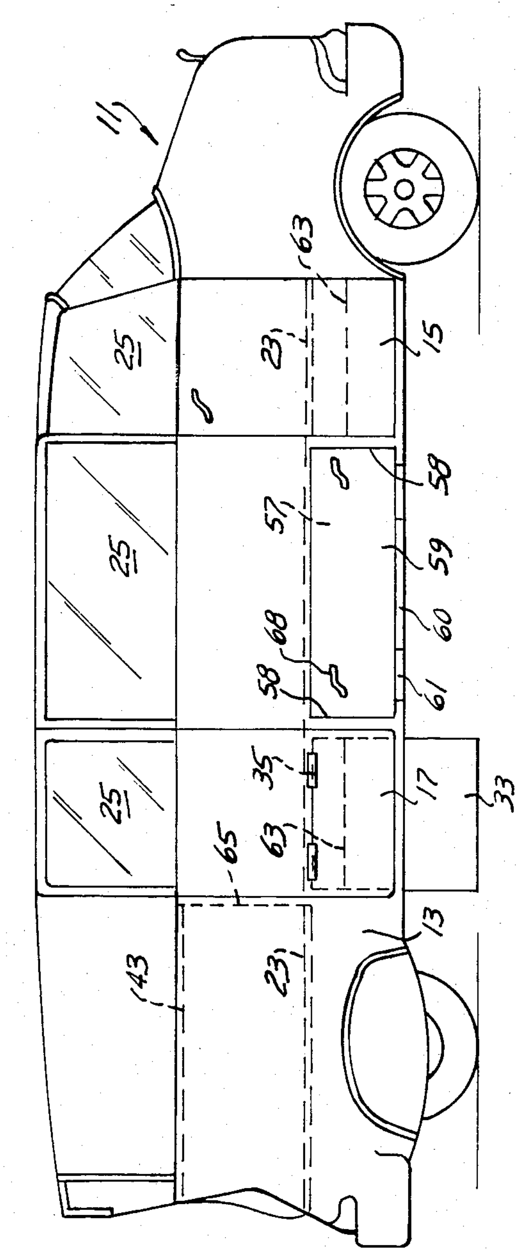
FIG. 1 is a schematic side elevational view of the present limousine hearse.
Figure 2:
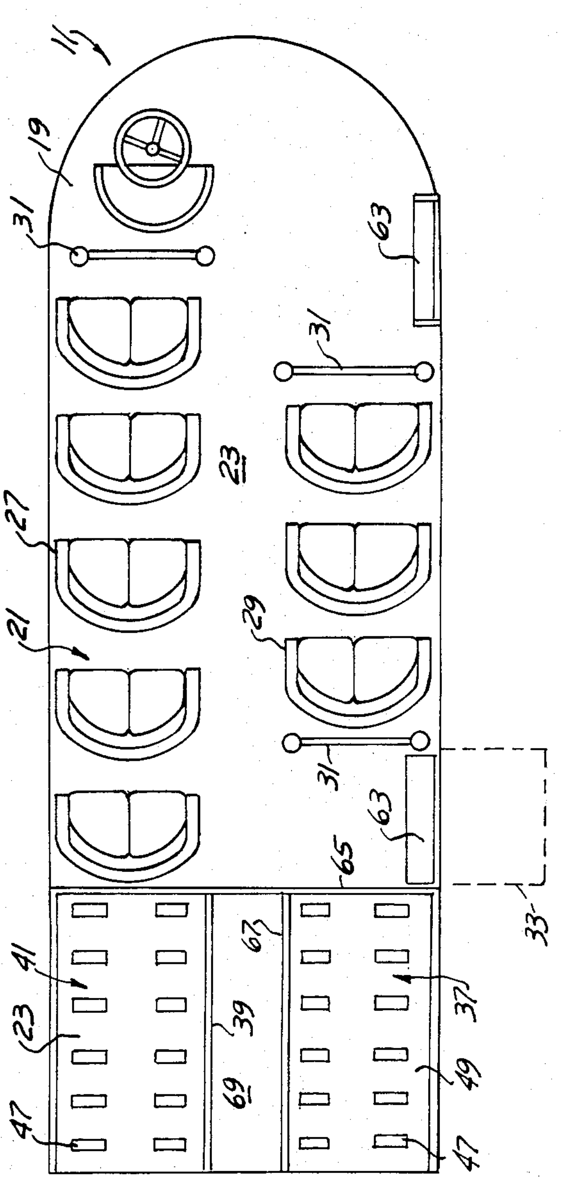
FIG. 2 is a fragmentary plan view thereof with the roof removed.

Referring to the drawings, the present limousine hearse is generally indicated at 11, FIGS. 1 and 2, as having an elongated body 13, front and rear ends, front door 15 within the body and rearwardly thereof rear door 17.

There is arranged longitudinally of the body substantially throughout its length from the driver area 19 an elongated planer floor 23 which extends to the rear end of the body and defines the passenger compartment 21. A plurality of preferably tinted windows 25 are mounted within the body in a conventional manner.

Opposed rows of seats 27 and 29 are suitably mounted upon floor 23 upon opposite sides of the body as in FIG. 2. The first transverse divider 31 extends across the forward end of one row of seats 27 rearwardly of the driver seat. An additional pair of longitudinally spaced transverse dividers 31 are arranged forwardly and rearwardly of the second row of seats 29.

Schematically shown in FIGS. 1 and 2 is the ramp 33 which is normally sectional and has a pivot assembly as at 35 upon one side of the floor for securing the ramp in position so that when unfolded, FIG. 1, it will extend down to the ground surface. It is regarded as equivalent that ramp 33 be replaced by a hydraulic lift, as is well known in the art. In either case, the ramp or lift is arranged over step 63 adjacent one of the doors 17.

A first upright partition 65 is mounted upon floor 23 and extends transversely of the length thereof and arranged intermediate the ends of body 13. In the illustrative embodiment, the transverse partition 65 is more closely adjacent the rear end of the body as shown in FIG. 2.

Partition 65 thereby defines upon one side thereof with the floor 23 the passenger compartment 21, which is adapted to receive and mount a pair of rows of seating at 27,29.

Figure 4:
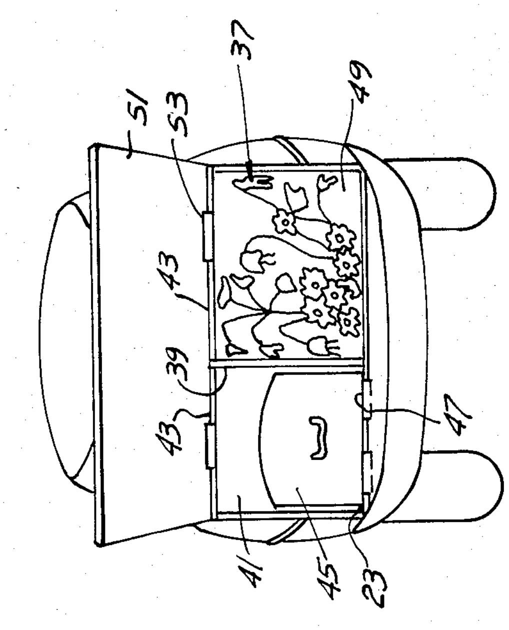
FIG. 4 is a rear elevational view thereof with the closure lid elevated for access to a pair of storage chambers.

The opposite side of transverse partition 65 defines with the floor a compartment 37, FIG. 4.

Within compartment 37 upon floor 23 and rearwardly of first partition 65 is a second longitudinally extending partition 39 arranged at right angles to first partition 65 and spaced between the sides of the body 13, FIG. 2.

The second partition 39 defines with the sides of the body and floor 23 a casket storage chamber 41, FIGS. 2 and 4, which may have a top cover portion 43, within which is stored elongated longitudinally extending casket 45.

To facilitate longitudinal assembly of the casket within casket chamber 41 there is provided within the floor 23 a series of longitudinally spaced laterally arranged pairs of casket support rollers 47 axially positioned within corresponding apertures in the floor 23 and journaled thereon in a conventional manner.

Figure 3:
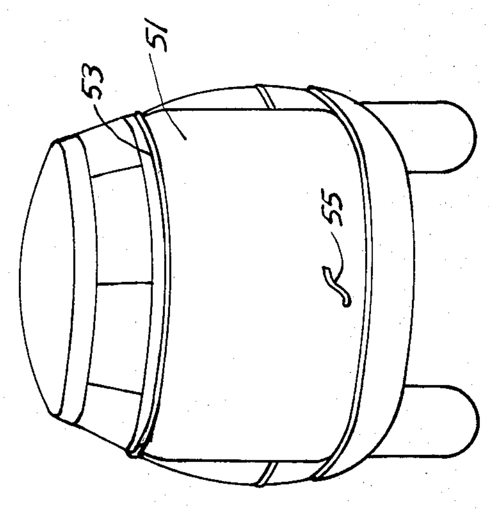
FIG. 3 is a rear elevational view thereof.

The second partition 39 further defines with floor 23 upon its opposite side an axially elongated flower storage chamber 49 adapted to receive and store flowers, FIG. 4. The substantially upright closure lid 51, FIGS. 3 and 4, is hinged as at 53 along its top edges, has a lift handle 55 and when raised as in FIG. 4 provides access to casket storage chamber 41 and flower storage chamber 49.

Formed within body 13 and arranged below floor 23, there is provided auxiliary lateral storage compartment 57 within which a casket, flowers or other equipment may be stored as desired. This storage compartment is defined by a pair of transverse longitudinally spaced upright partitions 58 below floor 23 which are spanned at their lower ends by the horizontally extending platform 60, FIG. 1. A suitable normally upright cover panel 59 is hinged along its lower edge at 61 to a portion of the body or platform 60 to provide access to storage compartment 57.

By this construction there is provided an improved limousine hearse assembly and wherein there is provided upon a unit floor which extends the length of the vehicle substantially rearwardly of the driver compartment 19, the forwardly arranged passenger compartment 23 adapted to seat a considerable number of people and rearwardly thereof and separated by the transverse partition 65 a pair of storage chambers 41,49 arranged upon opposite sides of the forwardly extending upright partition 39.

Chamber 41 is adapted to enclose and carry a longitudinally extending casket 45, and within the other chamber 49 a plurality of flowers, FIG. 4. Access to the storage chambers 41 and 49 is achieved by lifting the back lid 51, FIG. 4.

As a modification, a third upright partition 67 is secured upon floor 23, is spaced from and parallel to second partition 39 and at right angles to the first partition 65. The third partition and the adjacent side of the body defines an elongated chamber which may enclose a second casket, if desired. The third partition and the second partition define therebetween an intermediate storage area 69. Rollers 47 are also journaled within the floor 23 of compartment 49 so that said compartment may be used to transport a second casket.

Having described our invention, reference should now be had to the following claims:

We claim:

1. In a limousine hearse having an elongated body, front and rear ends, a roof and a pair of doors;
   - the improvement comprising a unit floor extending substantially the length of said body in a horizontal plane to said rear end;
   - a first partition upon said floor extending transversely of its length intermediate its ends and more closely adjacent said rear end;
   - said first partition defining an elongated passenger compartment forwardly of said partition adapted to receive a plurality of seats upon opposite sides thereof;
   - said first partition and floor defining a storage compartment rearwardly thereof extending to the rear of said body;
   - an upright second partition upon said floor within said storage compartment intermediate the sides of said body extending at right angles to said first partition defining upon one side thereof an axially elongated storage chamber adapted to receive and enclose a casket lengthwise thereof;
   - and upon its other side a second axially elongated storage chamber adapted to receive and enclose flowers or a second casket;
   - and a substantially upright closure lid hinged upon the rear end of said body normally closing off said storage chambers.

2. In the limousine hearse of claim 1, said doors being arranged upon one side of said body at opposite ends of said passenger compartment;
   - a step upon one side of said passenger compartment in registry with each door;
   - and a foldable ramp pivotally connected to said floor adjacent one of said doors, when unfolded adapted for engagement with a ground surface.

3. In the limousine hearse of claim 1, a pair of longitudinally spaced transverse partitions upon one side of said body below and depending from said floor intermediate said doors;
   - a platform extending between and interconnecting the lower ends of said transverse partitions defining with said floor an axially elongated auxiliary storage compartment;
   - and a tilt down cover panel pivotally connected to said platform.

4. In the limousine hearse of claim 1, an upright third partition upon said floor within said storage compartment spaced from and parallel to said second partition and at right angles to said first partition, defining between said third partition and the adjacent side of the body and axially elongated storage chamber adapted to receive and enclose a casket lengthwise thereof.

5. In the limousine hearse of claim 4, a pair of longitudinally spaced transverse partitions upon one side of said body below and depending from said floor intermediate said doors;
   - a platform extending and interconnecting the lower ends of said transverse partitions defining with said floor an axially elongated auxiliarly storage compartment;
   - and a tilt down cover panel pivotally connected to said platform.

* * * * *